United States Patent [19]

Morrison, Jr.

[11] Patent Number: 6,105,011

[45] Date of Patent: Aug. 15, 2000

[54] SECURITY SYSTEM AND METHOD FOR BUSINESS TRANSACTIONS WITH CUSTOMERS

[75] Inventor: William T. Morrison, Jr., Jacksonville, Fla.

[73] Assignee: First Union Corporation, Charlotte, N.C.

[21] Appl. No.: 09/044,503

[22] Filed: Mar. 19, 1998

[51] Int. Cl.$^7$ ................................................. G06F 17/60
[52] U.S. Cl. ............................... 705/45; 705/41; 705/44; 382/137; 382/138
[58] Field of Search ................................ 705/41, 45, 44; 382/137, 138

[56] References Cited

U.S. PATENT DOCUMENTS

| | | |
|---|---|---|
| 3,711,833 | 1/1973 | Starkey . |
| 4,641,239 | 2/1987 | Takesako . |
| 4,736,094 | 4/1988 | Yoshida . |
| 4,891,503 | 1/1990 | Jewell . |
| 5,036,461 | 7/1991 | Elliott et al. . |
| 5,053,607 | 10/1991 | Carlson et al. . |
| 5,144,115 | 9/1992 | Yoshida . |
| 5,267,149 | 11/1993 | Anada et al. . |
| 5,590,038 | 12/1996 | Pitroda . |
| 5,592,377 | 1/1997 | Lipkin . |
| 5,649,118 | 7/1997 | Carlisle et al. . |

OTHER PUBLICATIONS

Read, R.J., "EFTPSO: electronic funds transfer at point of sale", Electronics & Communication Engineering Journal, pp. 263–270, Nov. 1989.

Cordonnier, V.M., "Smart cards: present and future applications and techniques", Electronics & Communication Engineering Journal, pp. 207–212, Oct. 1991.

*Primary Examiner*—Edward R. Cosimano
*Assistant Examiner*—William R. McCarty
*Attorney, Agent, or Firm*—Kennedy Covington Lobdell & Hickman LLP

[57] ABSTRACT

A security system and method by which customers may be readily identified prior to cashing of checks, other cash-out transactions, or other business transactions, wherein each customer is issued an individualized customer identification card having at least a personalized multidigit customer identification number encoded thereon and, optionally, also encoded with additional personal data identifying the customer. To cash a check or conduct another form of business transaction, whether at an attended customer service station or at an automated machine, the encoded data on the identification card is read and the customer is required to input the personalized identification number assigned to the card. The transaction is not approved unless the customer correctly inputs the assigned identification number. In contemplated embodiments, the encoded data along with data regarding the transaction requested by the customer, e.g., obtained by optical scanning of a check or other item presented by the customer, is transmitted to a central computer system for execution of an approval-disapproval analysis or algorithm.

46 Claims, 8 Drawing Sheets

SECURITY SYSTEM AND METHOD FOR BUSINESS TRANSACTIONS WITH CUSTOMERS

BACKGROUND OF THE INVENTION

The present invention relates generally to systems and methods for conducting financial transactions and, more particularly, to security systems and methodologies for identifying customers and determining approvals for financial transactions, including for example but without limitation cash-out transactions performed by banks and other financial institutions or businesses.

Historically, banks, other financial institutions, retail businesses and the like have relied on customer identification as a principal means of security in cashing or accepting checks, issuing cash withdrawals from accounts, other forms of so-called "cash-out" transactions, and other similar or related forms of financial transactions. In decades past, customers tended to routinely patronize the same local bank and other establishments, and, likewise, the turnover rate among employees was relatively low, whereby such establishments could rely heavily on the ability of bank tellers and other employees to visually recognize customers. Over recent years, however, with the phenomenal growth and expansion of businesses of all types, including the increase of branch banking, increasing mobility of society in general, and similarly increasing rates of turnover among retail and customer service employees generally, particularly evidenced by high turnover of bank tellers, it has become nearly impossible to rely upon visual identification of customers as a means of security in conducting checking, cash-out and other financial transactions. During this period of time, the incidence of customer fraud in the cashing of checks and other similar transactions has grown to alarming levels.

As a result, it has been widely accepted for some time within the banking, financial and retail industries that reliance on visual identification of customers is a wholly inadequate means of security in conducting financial and other like transactions, yet many customers, particularly regular bank depositors and other repeat customers, resent the imposition of high levels of security. Accordingly, these businesses and establishments have been continually seeking new ways to address the need for a reliable system of security in identifying customers as part of the process of approving or disapproving financial and other like transactions which balances the goal of attempting to eliminate customer fraud while minimizing the intrusiveness of the security measures to the customer.

One means of substantially reducing and even largely eliminating losses to fraudulent transactions would be for banks to refuse to cash or accept checks of non-depositors and for other businesses similarly to refuse non-cash transactions with persons other than regular customers, but such a policy presents equally negative public relations problems and customer dissatisfaction. Perhaps the simplest and most common means of customer identification in such transactions is to require a customer to present a recognized form of photographic identification, such as a driver's license, passport, or the like. Unfortunately, the ease with which such forms of photographic identification can be tampered or otherwise altered has made this form of security less than adequate. Businesses, including banks, continue to lose large sums of money on fraudulent transactions in which customers utilize false forms of identification.

Other customer identification schemes have involved requiring non-regular customers to submit to thumb printing in order to complete transactions. While such programs have proven highly effective in minimizing check cashing fraud, the negative reaction and perception of many customers to such programs has prevented banks and other businesses from larger scale implementation of this security measure. Much more sophisticated electronic systems for visually identifying customers are available. While customer reaction to such systems is very positive in that the systems are largely passive in operation, currently available systems are quite expensive, particularly if implemented across a large number of business locations, e.g., bank branches, making it more difficult for businesses to justify the expense in comparison to losses which could be expected without such a security system.

SUMMARY OF THE INVENTION

It is accordingly a fundamental object of the present invention to provide an improved system and methodology for use by businesses for establishing customer identification in, and determining approval for, business transactions with customers which addresses many of the disadvantages of prior security measures. A more specific object of the present invention is to provide such a system and methodology which balances the need for heightened levels of security with minimum additional customer intrusiveness. In particular, it is an object of the present invention to provide a security system and methodology which is markedly more effective in deterring and preventing customer fraud than conventional customer identification based on customer presentation of a driver's license, passport or other photographic identification, without the high cost of more sophisticated electronic systems. In this regard, the present invention seeks to optimize the use of electronic devices which may be already in use within many businesses, such as a centralized data storage and processing means (e.g., a mainframe computer), computer terminals at transaction stations, check microreaders, etc.

Briefly summarized, the present invention accomplishes these and other objects and advantages by a security system for business transactions with customers which relies fundamentally upon the issuance to each customer of an individualized customer identification card encoded with at least a personalized multidigit customer identification number by which the customer may be subsequently identified. Each customer transaction is basically conducted by requiring the customer to present the identification card at a transaction station (which may, for example, be a teller window at a bank branch operated by a bank teller or other representative or, alternatively, an unattended automated machine such as an ATM). At the transaction station, the encoding on the identification card is read by a suitable electronic reading device and the customer is required to input his or her personalized customer identification number. The reading device then verifies whether or not the identification number has been correctly input by the customer. In the event the customer cannot correctly input the identification number assigned to the identification card, the transaction is refused.

In accordance with the present invention, a supplementary means or methodology is provided in addition to the personalized customer identification number encoded on the identification card to increase the level of security in conducting each business transaction. According to one aspect of the invention, the card may additionally be encoded with predetermined personal information regarding the respective customer to provide an additional way of confirming the customer presenting the card for a business transaction is the authorized card holder to whom the care was issued. Alternatively or in addition, individualized criteria can be preestablished for each customer, e.g., upon the issuance of the identification card, based upon which criteria approval or disapproval of each business transaction by the customer will be determined. Such criteria may be stored in encoded form on each customer's identification card and/or in a centralized data storage and processing means, e.g., a mainframe computer, to be accessed upon each customer transaction.

Under one representative embodiment of the present system and methodology, particularly adapted for use by banks or other businesses in cashing or accepting checks or conducting other cash-out transactions, bank or business branch locations are set up for onsite issuance of customer identification cards through one or more designated officers or representatives of the bank or business. Upon issuing each customer identification card, the business officer or representative obtains from the customer various items of personal information and, at the same time, individualized criteria will be established for each respective customer as to transactions the customer will be authorized to make (e.g., designating approved check payors from whom the customer will be authorized to cash checks and/or establishing predetermined maximum check-cashing amounts). In addition to the assigned personal identification number for the customer, the identification card may also be encoded with at least some of the customer's personal information (e.g., height, weight, social security number, birth date, etc.) by which a supplementary identification of the customer can subsequently be made visually or otherwise by business personnel. A computer file on each customer is then created within the business mainframe computer system (or other centralized data storage and processing system), in which file is contained the personal information regarding the customer and the predetermined criteria for transactions by the customer established by the representative when issuing the identification card. The central data storage and processing system of the business is also suitably programmed to make an approval-disapproval determination of each transaction requested by a customer according to the criteria preestablished for the customer and optionally also according to any other generalized criteria which may be established by the business, e.g., by executing upon each transaction an approval-disapproval algorithm.

In this more sophisticated embodiment, each transaction station, whether at a location of the business operated by a live person (e.g. a bank teller station) or at an automated machine (e.g. a bank ATM), is equipped with a card reading device for electronically reading the encoded data on each customer's identification card and a keypad or similar means for the customer to input his or her personalized identification number. The transaction station also is preferably equipped with a so-called microreader for optically detecting relevant information on the face of a check or like item being presented by the customer. The transaction station is connected by appropriate means with the centralized data storage and processing system of the business for two-way electronic communication by which the reading of the encoded data on the identification cards, the recognition of the correct input of identification numbers by customers, and the check data recognized by the microreader is transmitted to the centralized data storage and processing facility and, in turn, the result of the approval-disapproval determination executed by the central data storage and processing facility is transmitted back to the transaction station. In the case of an approval of the transaction as requested by the customer, the transaction is completed by issuing the appropriate sum of cash to the customer or otherwise fulfilling the customer transaction. The transaction is refused and terminated if the central data storage and processing facility disapproves the transaction.

In the preferred embodiment, the customer identification cards are encoded electronically, such as by means of a magnetic or other electronic data storage medium on each identification card. In embodiments wherein the transaction station is attended live by a representative of the bank or other business, a monitor or other similar means is provided for displaying to the business representative a signal or other notification indicating whether the customer correctly inputs his or her personalized customer identification number and also for displaying to the representative the customer's personal information encoded on the card, whereby the representative can visually verify the identity of the customer in supplementation of the identification provided by the correct input of the customer's personalized identification number. In a preferred embodiment, the control programming stored within the centralized data storage and processing system includes suitable computer software routines or other appropriate means by which the data contained within each customer's data file is continuously compiled and updated according to each transaction conducted by the customer and the approval-disapproval algorithm executed by the control program is based at least in part on such historical data compiled for the respective customer (e.g., taking in account in the approval-disapproval determination any negative events such as presentment of bad checks in the customer's history of usage of the card).

Other features and advantages of the present invention will be apparent to persons skilled in the art from the disclosure of two contemplated embodiments which are representative of the present security system and methodology set forth below with reference to the accompanying drawings.

DESCRIPTION OF THE PREFERRED EMBODIMENTS

While the accompanying drawings and the following description thereof disclose the present invention in relation to embodiments thereof particularly adapted for use by banks and like financial institutions or businesses in cashing checks and otherwise performing so-called cash-out transactions for customers, it is to be emphasized and understood, as already indicated above, that the security system and methodology of the present invention is neither intended nor to be interpreted or understood to be limited to applications or embodiments within the banking field. Rather, the present invention has a broader potential application and utility which is contemplated to be equally adaptable to a much wider range of businesses and other forms of transactions with customers. For example, it is contemplated that the security system and methodology of this invention would be equally beneficial to be used by any retail establishment which deals with a regular customer base, e.g., the invention would be well adapted for use by a grocery store chain in determining approval for checks presented by regular customers in payment of purchases. Fundamentally, therefore, it is to be understood that the present invention is contemplated to the applicable and usable in substantially any business needing a secure means of reliably identifying regular customers and for determining approval or disapproval of business transactions with such customers. The following description of the present invention in relation to contemplated banking embodiments is therefore provided herein solely by way of example for purposes of providing an enabling disclosure of the invention, but does not limit the scope or substance of the invention.

Figure 1:
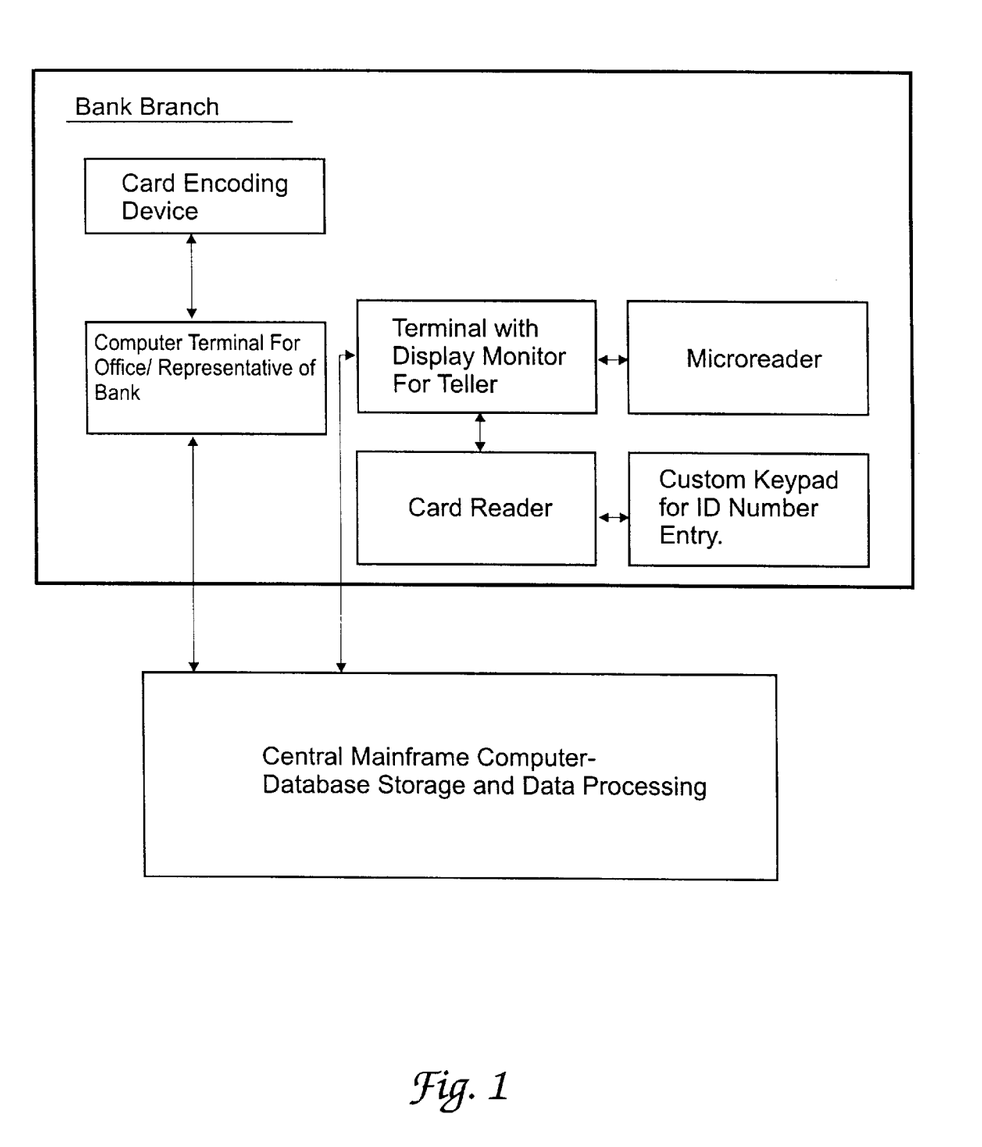
FIG. 1 is a schematic block diagram representatively depicting the physical components utilized at a bank branch for issuance of customer identification cards in accordance with a banking embodiment of the security system and method of the present invention and also depicting the physical components utilized in embodiments of the system and method for performing cash-out transactions at an attended teller window in the bank branch.
Figure 2:
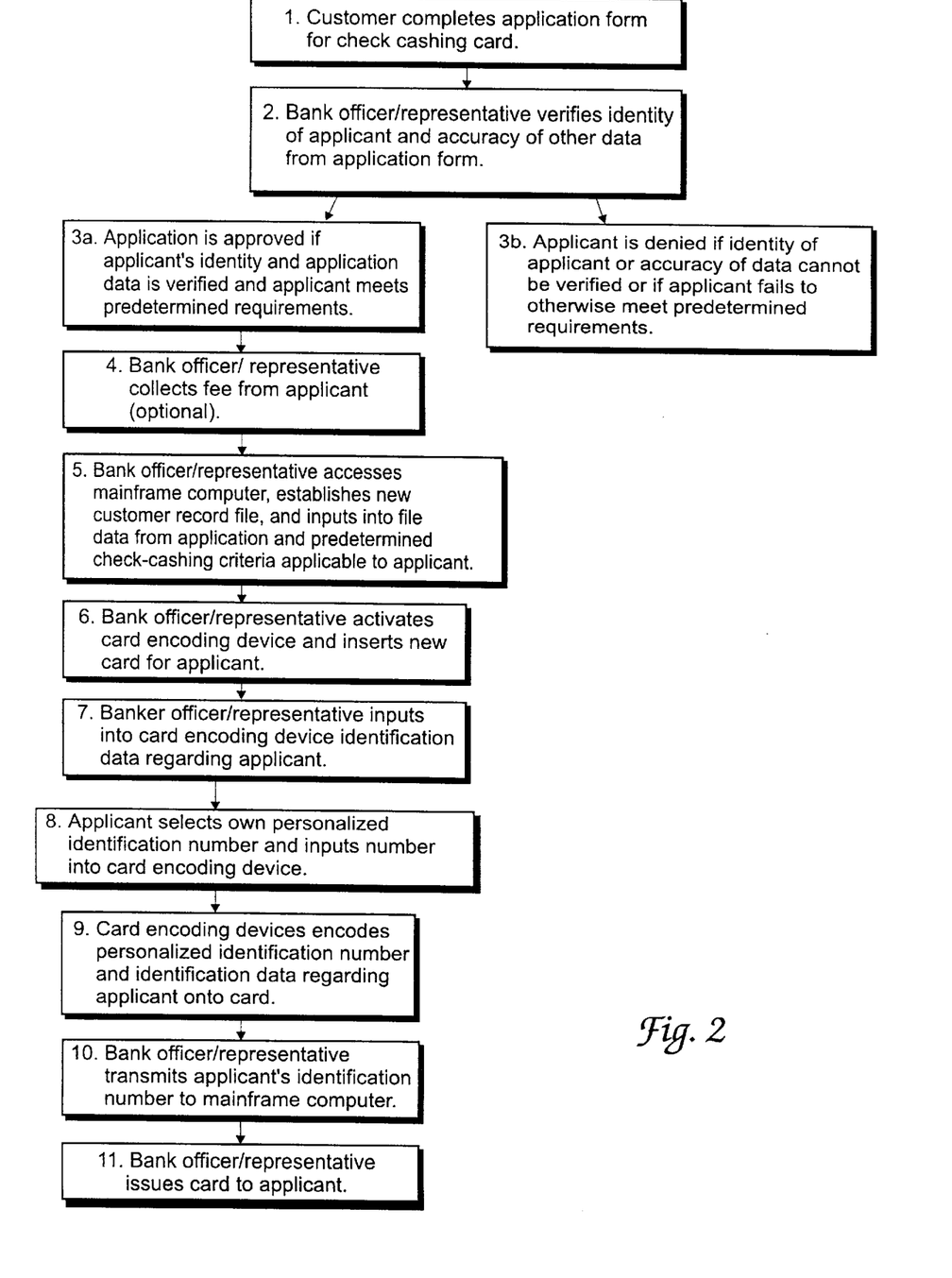
FIG. 2 is a schematic block diagram representatively illustrating the sequence of steps carried out by a bank representative and a customer for issuance of a customer identification card at a bank branch in the embodiment of FIG. 1.
Figure 3A:
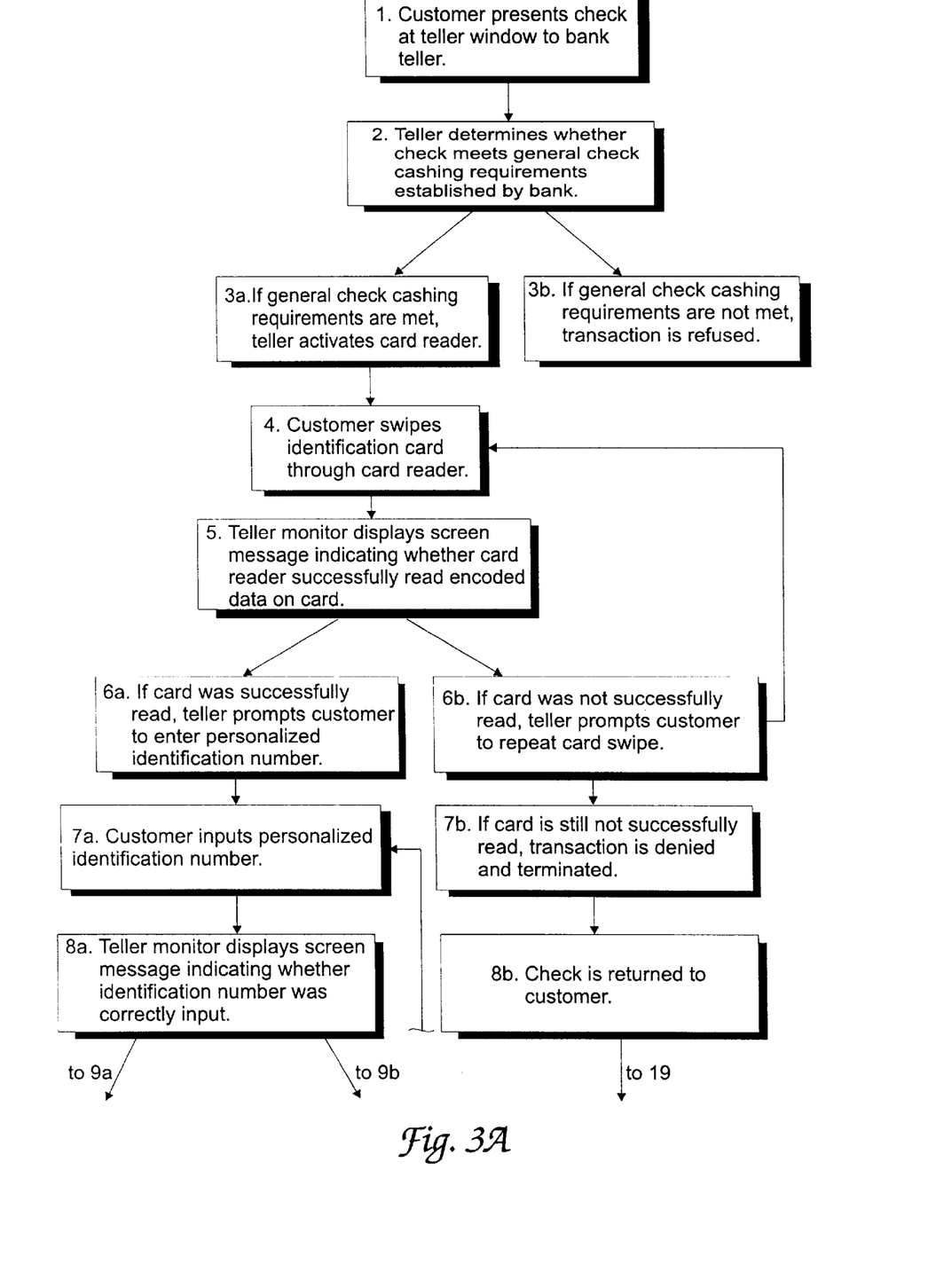
FIGS. 3(A) and 3(B) and 3(C), collectively, are a schematic block diagram depicting the program logic carried out by the physical components depicted in FIG. 1 in conducting cash-out transactions at an attended teller window under the embodiment of FIG. 1.
Figure 3B:
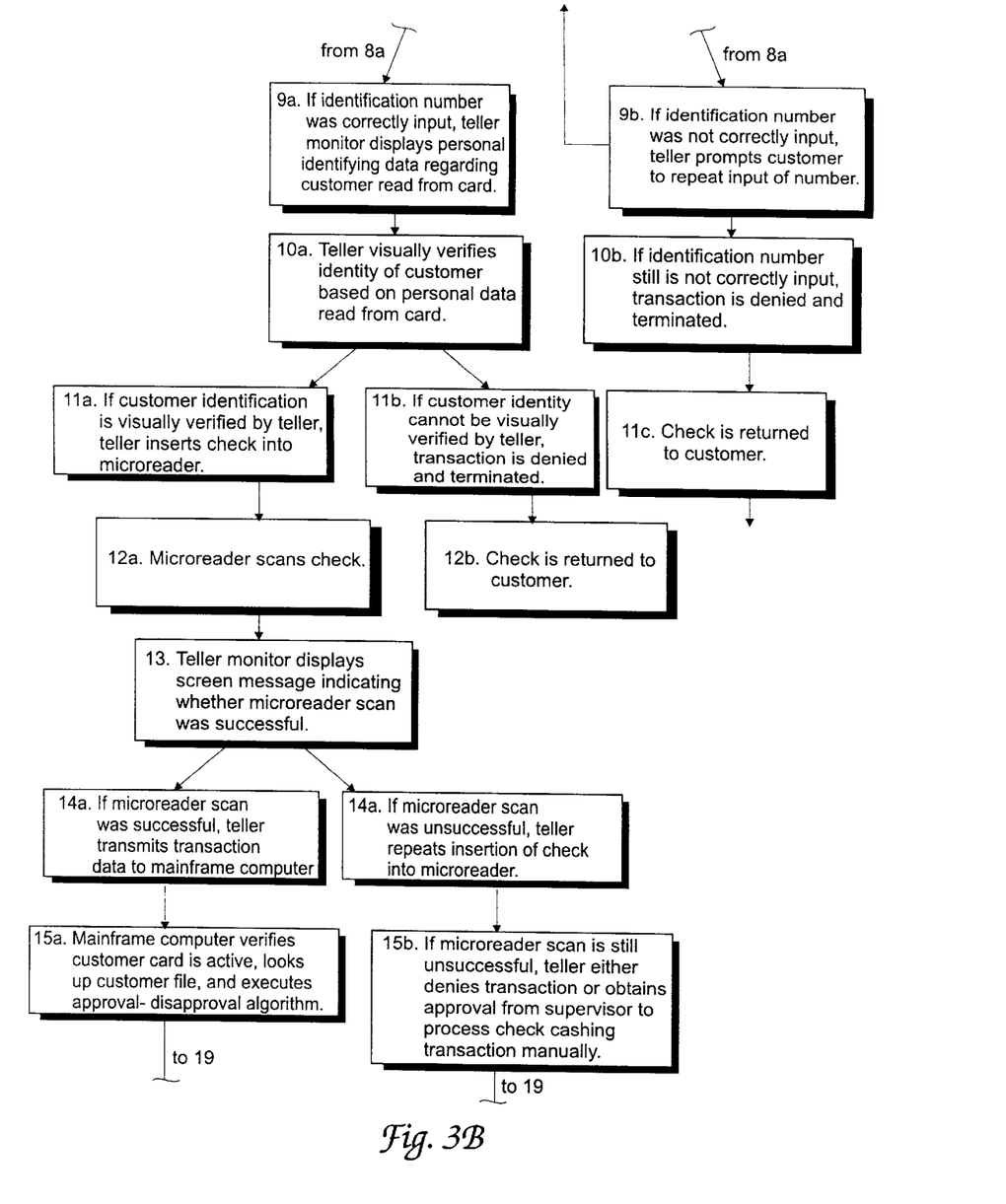
Figure 3C:
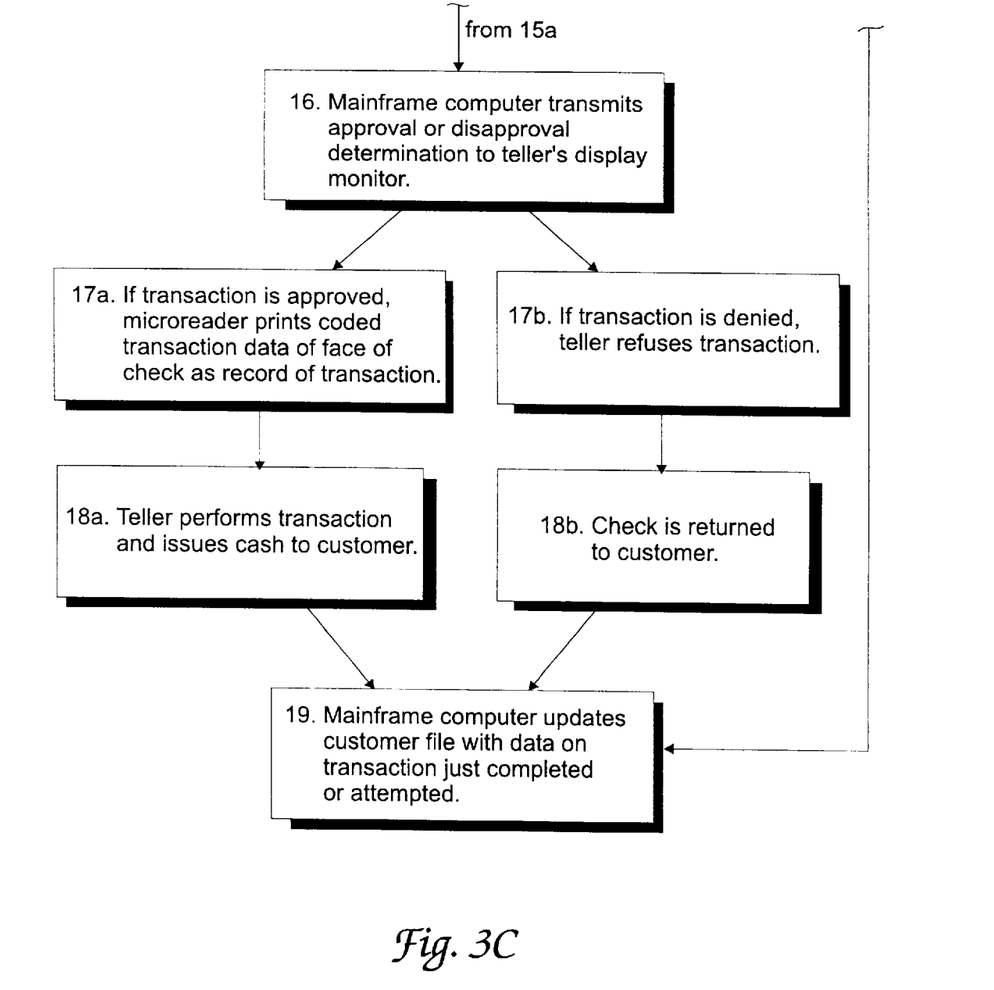

Referring now to the accompanying drawings and initially to FIGS. 1–3, FIGS. 1 and 2 depict the components and manner of operation utilized under one contemplated banking embodiment of the present invention for issuance of personalized identification cards to customers, while FIGS. 1 and 3 depict the manner in which customers utilize such personalized identification cards for conducting cash-out transactions, particularly the cashing of checks, at a banking location or facility attended by a banking representative, such as a teller window operated by a bank teller in a traditional bank branch location.

As depicted in FIG. 1, one of the advantageous features of the present invention is that the personalized customer identification cards on which the operation of the present invention is based may be issued to bank customers at the same time and location at which the customer makes application for an identification card, e.g., before a bank officer at a bank branch location. Currently, it is contemplated to be preferable that the identification cards be conventional forms of plastic cards sized to be carried in a wallet or purse, with an encodable magnetic strip formed into one surface of the card. Cards of this generic type are well known in the industry and, hence, need not be described more fully herein. However, it is to be understood by persons skilled in the art that other forms of identification cards capable of otherwise storing data electronically in encoded form, such as conventional so-called "smart" cards having an embedded electronic microchip or the like, may also be utilized. Fundamentally, an identification card according to the present invention need only have some form of suitable means for being electronically encoded with a personalized identification number assigned to the bank customer to whom the card is issued, along with other basic personal data regarding the customer sufficient for customer identification.

For purposes of on-site issuance of such identification cards in accordance with the present invention, a bank branch, or other suitable banking location, will be equipped with a conventional form of encoding device, representatively indicated at 10, compatible with the form of identification card selected by the bank for use in carrying out the present invention. Like the cards themselves, such devices are well known within the industry, and are currently in common use for issuing such conventional cards as credit cards, automated teller machine (ATM) cards, and the like.

For security purposes, access to the card encoding device 10 at each individual bank branch will be restricted, e.g., by locating the device in the office of a bank officer or other representative, or otherwise in a secure non-public area of the bank, and by restricting operation of the device to only designated personnel authorized to issue the personalized customer identification cards. The card encoding device 10 is connected in conventional manner to a computer terminal, indicated representatively at 12, utilized by the bank officer or representative, which in turn is connected by modem, telephone lines, or other form of conventional communications wiring or cabling, to a central facility for storage and processing of bank data, such as a conventional mainframe computer system, indicated representatively at 14. As will thus be understood, by providing this equipment on-site at a bank branch, and by supplying authorized bank officers and representatives with blank encodable identification cards, qualified customers may be issued a personalized encoded card immediately upon making application at the bank branch.

In turn, teller windows or stations at such bank branches will also be equipped with appropriate devices and equipment for accepting the identification cards in the cashing of checks or otherwise conducting cash-out transactions for such customers. By way of example, as also depicted in FIG. 1, a representative teller station will accordingly be equipped with a conventional form of electronic card reading device 16, typically having a slot through which the card may be inserted and slid or "swiped" to expose its magnetic strip and the encoded data thereon to be optically read by compatible electronic components within the card reader 16. The card reader device 16 also will preferably have an integrated or otherwise associated numeric or alphanumeric keyboard or keypad 18 electronically connected with the card reader 16 for purposes of customer input of the personalized identification number assigned to the card. Such card reading devices are also well known within the industry and, for example, are in generally widespread use in connection with retail credit card acceptance equipment, automated teller machines, and the like, whereby the card reader 16 and associated keypad 18 need not be more fully described herein.

The teller station, as is conventional, is also equipped with a computer terminal, generically indicated at 20 and typically comprising a display monitor and an alphanumeric keyboard (not separately shown), connected through conventional communication means with the central mainframe computer system 14 of the bank. The card reader 16 is connected to the computer terminal 20 to communicate therewith and, in turn, with the central mainframe computer system 14. The teller station is also preferably equipped, as is known, with a so-called microreader 22 adapted to optically scan and read encoded information on the face of checks presented to the teller. The microreader 22 is also connected to the computer terminal 20 at the teller station.

The methodology of the present invention for issuing personalized identification cards to customers may thus be understood with reference to the block diagram of FIG. 2 and, in turn, the methodology for use of such cards in the cashing of checks or in performing other cash-out transactions may be understood with reference to the block diagram of FIG. 3. While it is contemplated that such identification cards may be issued both to existing bank customers, i.e., depositors holding existing accounts with the issuing bank, one of the principle uses and advantages contemplated for the present invention will be to issue such identification cards to persons who are not bank depositors and may not be a candidate for establishing an existing bank account, yet seek to utilize the bank's services for cashing of checks on a routine or otherwise frequent basis under circumstances in which the nature of such checks, the payor or payors of such checks, and/or the amounts of such checks may be predicable or otherwise preestablished, e.g., regularly weekly, biweekly or monthly paychecks. The present invention, thus, enables a bank to provide service to such non-depositor customers while minimizing the risks of losses normally associated with such transactions.

Accordingly, assuming the more typical circumstance applicable to the present invention, under which a non-depositor seeks to obtain check cashing privileges with the bank, the prospective customer initially completes an application form to receive one of the personalized identification cards, as represented by box 1 in FIG. 2. As currently contemplated, the application form would obtain typical personal information concerning the applicant sufficient to verify the applicant's correct identity (e.g., name, address, place of employment, social security number, physical features, birthdate, etc.), credit history and other factors affecting the applicant's creditworthiness, and data concerning the check cashing transactions for which the applicant seeks to be approved (e.g., if the applicant seeks to routinely cash paychecks, data would be obtained concerning the identity of the applicant's employer, the employer's bank and payroll account, the dates and/or frequency of pay periods, and the amount or typical range of paychecks).

Based on such information, the bank officer or representative initially verifies the correct identity of the applicant and the accuracy otherwise of the information provided by the applicant on the application form, for example, by requiring the applicant to present one or more forms of identification, a current paycheck or paycheck stub, etc., as represented in box 2 of FIG. 2. Assuming the applicant's identity and the data provided by the applicant in the application form can be verified, the bank officer or representative then analyzes the data according to any predefined criteria or requirements established by the bank and reaches a decision as to whether the application is to be approved or disapproved, as alternatively represented by boxes 3a and 3b in FIG. 2.

Upon approval of an application, it is contemplated that the bank officer or representative would collect a fee from the Applicant (box 4, FIG. 2) to defray the costs of the identification card and otherwise to compensate the bank for the check cashing services to be performed, especially in the case of applicants who are not existing bank depositors, although such fee may be optional in the bank's discretion. The bank officer or representative then accesses the mainframe computer system 14 of the bank through the officer's computer terminal 12 and inputs appropriate data from the application form to establish a new customer data file or record (box 5, FIG. 2). At the same time, the bank officer determines any limitations or criteria to be imposed on the check cashing privileges being issued to the customer (e.g., the customer could be authorized for cashing any checks up to a preauthorized maximum amount or, under appropriate circumstances, the authorized privileges could be more limited, such as restricting the privileges to cashing only of paychecks issued by a designated payor/ employer and drawn on a designated bank and account up to a predetermined maximum check amount) and appropriate data or information concerning such restrictions or criteria are also input into the new customer's data file.

After verifying that the new customer's data file has been properly established within the bank's mainframe computer system 14, the bank officer or representative at the local branch obtains a blank new identification card from the supply on hand and inserts the blank card into the card encoding device 10 to initiate the card encoding process. One of the key features of the present invention is that each identification card is encoded with an identifying multidigit number which, for security reasons, the customer selects rather than the bank officer or representative and the customer inputs the selected identification number into the card encoding device. At the same time, the bank officer, utilizing the computer terminal 12 transfers to the card encoding device 10 for encoding onto the identification card some or all of the personal data regarding the customer obtained from the application form, which provides a supplementary means of properly identifying the customer when the card is presented upon subsequent transactions. See boxes 6–8 in the blocked diagram of FIG. 2.

The bank officer or representative then actuates the card encoding device to encode the personalized identification number and the customer's personal data onto the magnetic strip of the card and, at the same time, the bank officer actuates transmission of the customer's selected identification number to the mainframe computer 14 to be electronically recorded in the customer's data file, as indicated in boxes 9 and 10 of FIG. 2. The thusly encoded identification card is then issued to the new customer (box 11), who is then equipped to carry out check cashing transactions at the bank, subject to any predetermined criteria or limits established during the application process.

As reflected in FIG. 3, the customer under one embodiment of the present invention can utilize the identification card for cashing of checks at any teller window in a branch of the bank suitably equipped to read such identification cards. FIG. 3 basically illustrates in block diagram format the sequence of steps carried out in such a transaction by means of the identification card of the present invention in conjunction with a control program contained within computer software stored on the bank's mainframe computer system. As persons skilled in the art will readily recognize and understand, however, the sequence of steps in the control program logic depicted in FIG. 3 are provided by way of example and not for purposes of limiting the present invention. On the contrary, it is contemplated that the basic characteristics of the present invention have a broad potential utility and application, such that many variations and modifications on the methodology set forth in FIG. 3 will be readily apparent to persons skilled in the art.

As represented by box 1 in the block diagram of FIG. 3, the customer's use of his or her personalized identification card is initiated in each transaction by the customer presenting a check to be cashed to a bank teller at a teller window or station in a suitably equipped branch of the bank. Initially, the teller inspects the check visually to determine whether it meets basic pre-established check cashing requirements imposed by the bank, e.g., whether the check is drawn on the bank itself or another bank whose checks are recognized by the bank, whether the check is a two-party check, etc. (box 2). If not, the transaction will be immediately refused (box 3b), but if the check meets the bank's general check cashing requirements, then the teller asks the customer to insert his or her personalized identification card into, and to swipe the card through, the card reader 16 (box 4). The control program for the card presentation system displays a message on the teller's display monitor twenty indicating whether or not the encoded data on the customer's identification card was successfully read by the card reader 16 (box 5). If not (box 6b), the teller prompts the customer to repeat the insertion of the card into the card reader 16. If after two or more repeated attempts, the card cannot be successfully read by the card reader 16, the teller refuses and terminates the check cashing transaction (box 7b) and returns the check to the customer (box 8b).

If the encoded data on the customer's card has been successfully read by the card reader 16 (box 6a), the teller next prompts the customer to enter his or her personalized identification number utilizing the keypad 18 associated with the card reader 16. Once the customer has done so (box 7a), the control software for the check cashing system actuates a message on the teller's display monitor 20 indicating whether the identification number was correctly input by the customer (box 8a). If not, then the teller prompts the customer to repeat the keypad input of the identification number (box 9b). If the customer is unable to correctly input the identification number after two or more repeated attempts, the teller terminates the transaction (box 10b) and returns the check to the customer (box 11c).

Upon correct input by the customer of the personalized identification number assigned to the card (box 8a), the control program actuates a display on the teller's monitor 20 of a printed readout of the encoded personal data obtained from the identification card (box 9a), e.g., customer name, birthdate, physical characteristics, etc., which the teller compares against the customer presenting the check to be cashed as a supplementary means of verifying the identity of the customer (box 10a). If the customer cannot be visually verified by the teller (e.g., the encoded data on the card indicates the customer should be a woman, yet the person presenting the check to be cashed and utilizing the identification card is a man), the teller terminates the transaction (box 11b) and returns the check to the customer (box 12b).

Upon visual verification by the teller that the customer presenting the check and utilizing the identification card corresponds to or is otherwise consistent with the personal data obtained from the encoding on the card, the teller inserts the check into the microreader 22 (box 11a), which then optically scans the face of the check (12a). The control program for the check cashing system then initiates a display message to appear on the teller's monitor 20 indicating whether the check scanned by the microreader 22 was successful (box 13). If not, the teller repeats the microreader scan of the check (box 14b). If after repeated attempts by the teller the microreader scan cannot be performed successfully, the teller makes a discretionary decision to either deny the check cashing transaction or to seek approval from a bank officer or other superior for processing the check cashing transaction manually (box 15b).

Once the microreader scan has been performed successfully (box 14a), the teller initiates a "send" command whereby the control program for the system causes relevant data concerning the transaction, such as the encoded identifying information on the customer read by the card reader 16 and data concerning the check to be cashed as scanned by the microreader 22 and/or otherwise input by the teller to be transmitted, to the mainframe computer system 14 (box 14a). Within the mainframe computer, the control program for the system then looks up the customer file, verifies that the customer's identification card is active, and initiates the execution of a computer software algorithm or other analytical software routine programmed for determining whether the check cashing request by the customer will be approved or disapproved (box 15a). For example, it is contemplated that the analytical algorithm executed by the control program will compare the transmitted data on the check cashing request (e.g., the identity of the bank on which the check is drawn, the payor of the check, and/or the amount of the check) against the check cashing criteria or limits preestablished by the bank officer when the identification card was originally issued, thereby to verify that the check cashing request does not exceed the predetermined limits or otherwise deviate from the pre-approved check cashing criteria for the respective customer.

The result of this approval/disapproval algorithm within the mainframe computer is then transmitted to the teller's display monitor 20 in the form of a display message indicating whether the transaction is to be approved or disapproved (box 16). If the transaction is disapproved, the teller refuses the transaction (box 17b) and the check is returned to the customer (box 18b). On the other hand, if the transaction is approved, the microreader 22 is automatically actuated to imprint onto the check coded transaction data as a record of the transaction (box 17a) and the teller then completes the transaction by issuing the appropriate amount of cash to the customer (box 18a).

Another important characteristic of the preferred embodiment of the invention is the ability of the control program to continuously update the customer's file within the mainframe computer with historical data reflecting each transaction completed or attempted by each respective customer, as representatively indicated by box 19 in FIG. 3. Hence, whether the check cashing transaction is approved and therefore completed (box 18a) or is disapproved (box 17b) or for any other reason is refused (boxes 8b, 11c, 12b or 15b), the end result of the transaction is transmitted to the customer's file within the mainframe computer. In turn, upon subsequent check cashing transactions requested by the customer, the control program may include, at least in part, an analysis of the customer's historical use of the identification card as part of the execution of the approval-disapproval algorithm represented in box 15a.

Figure 4:
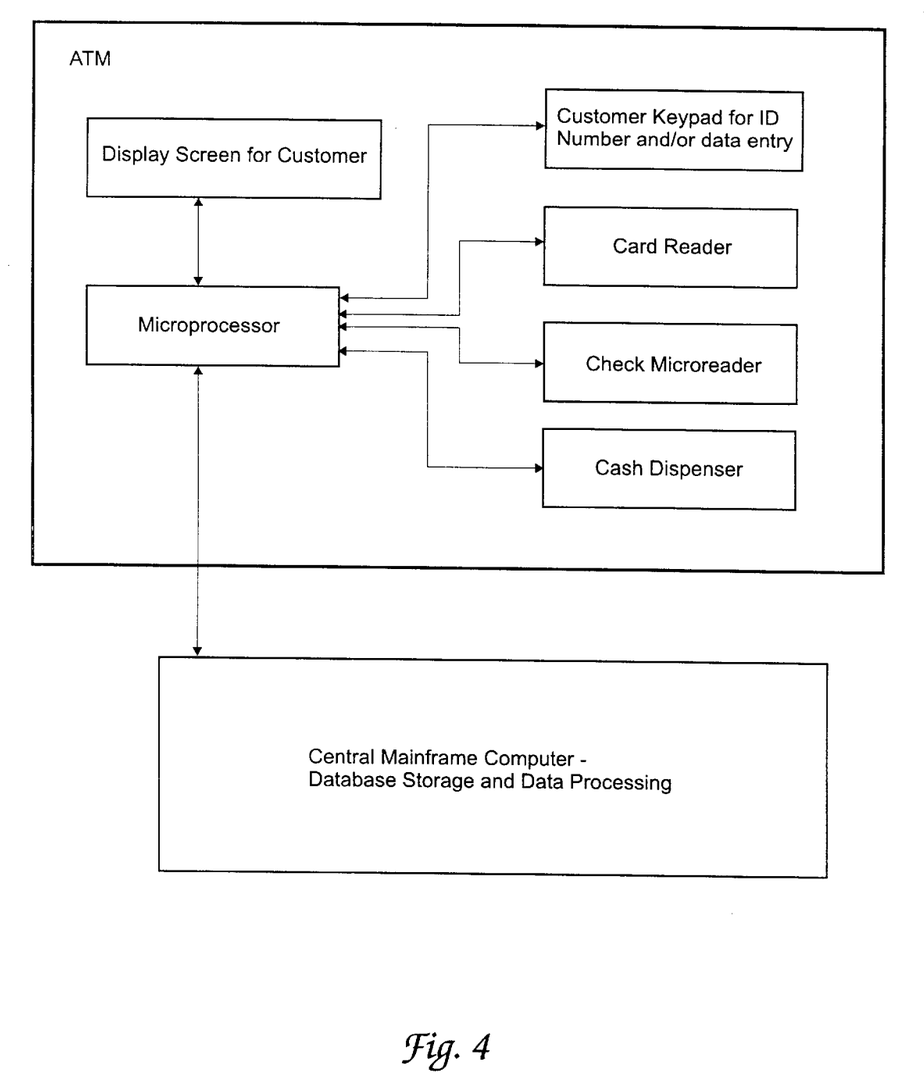
FIG. 4 is a schematic block diagram depicting the physical components utilized in the present security system and method in an alternative banking embodiment wherein cash-out transactions are conducted through an automated teller machine.
Figure 5A:
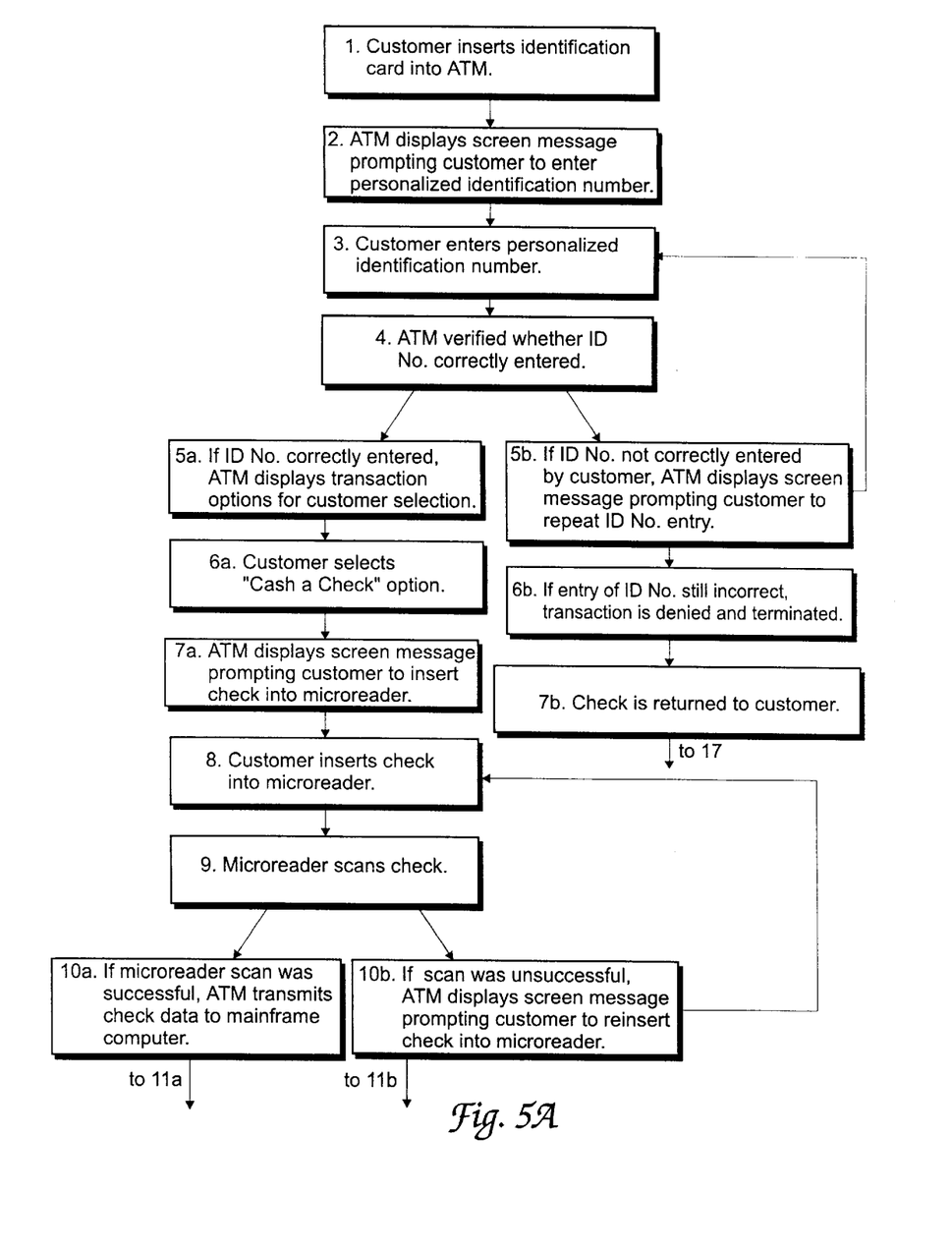
FIGS. 5(A) and 5(B), collectively, are a block diagram depicting the program logic carried out by the physical components shown in FIG. 4 in conducting cash-out transactions at an automated teller machine.
Figure 5B:
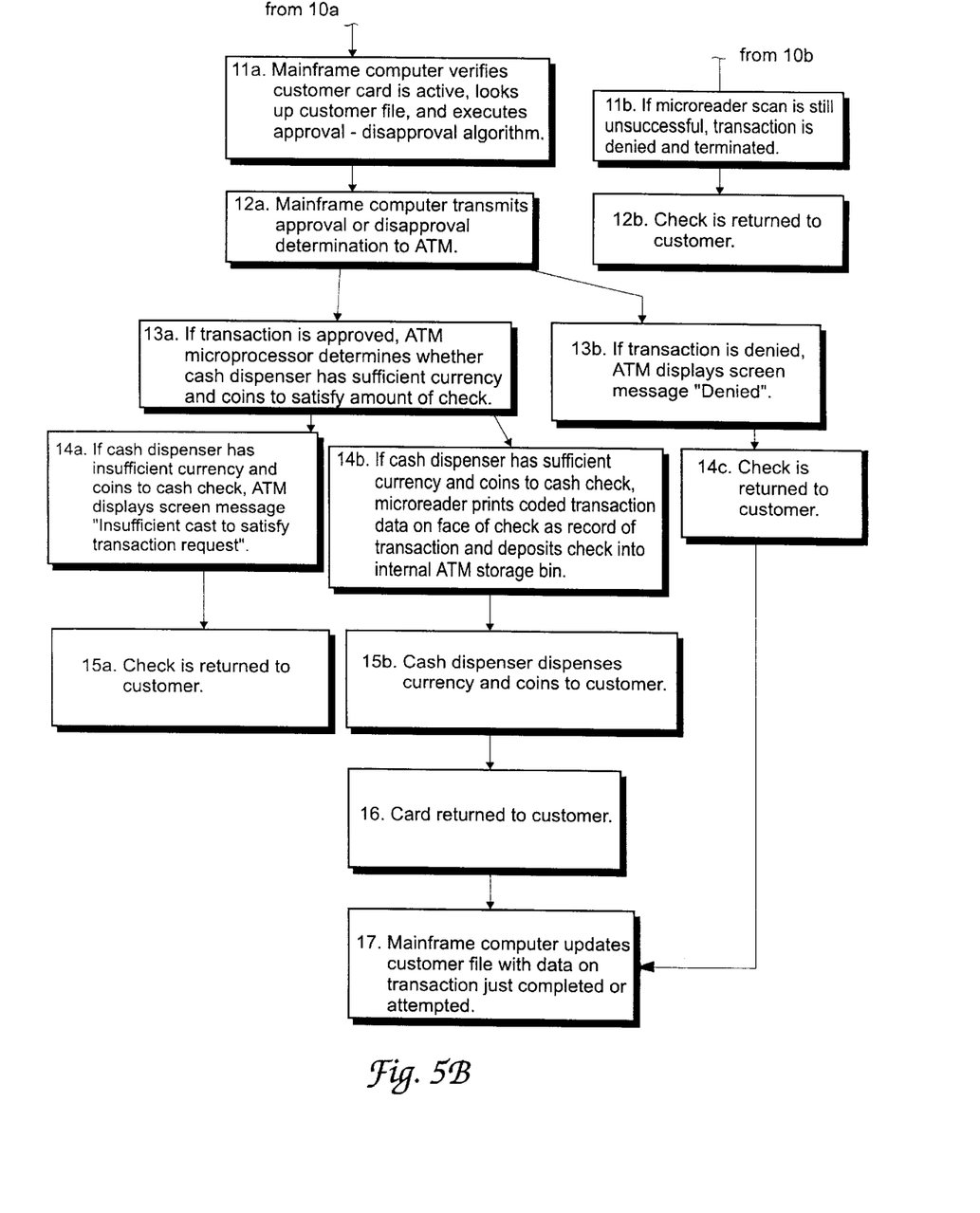

With the proliferation over recent years of automated teller machines as a means of performing routine banking transactions without requiring interaction with a teller or other bank representative, it is contemplated that the identification cards to be issued in accordance with the present invention may also be utilized by customers under an alternative embodiment wherein checks may be cashed by means of an automated teller machine, as diagrammatically represented in FIGS. 4 and 5. FIG. 4 represents in block diagram form the basic operational components of such an automated teller machine, while FIG. 5 depicts in block diagram form the basic steps carried out in the performance of a check cashing transaction utilizing the automated teller machine of FIG. 4.

With reference initially to FIG. 4, the automated teller machine represented therein is indicated generally at 24 and is basically of a conventional construction having an on-board microprocessor 26 connected via modem, telephone lines, or other conventional means with the central mainframe computer system 14 of the bank for two-way communication there between. The microprocessor 26 stores a computer software program for controlling operation of a display screen 28 viewable to the banking customer, a keypad or other alphanumeric or numeric input means 30 accessible and operable by the customer, a magnetic card reading device 32 operable for reading data encoded on the magnetic strip of the identification cards, and a mechanism 34 for dispensing currency (preferably paper bills and coins) from a storage repository housed within the automated teller machine 24.

As thus far described, the automated teller machine 24 is essentially conventional in componentry and structure. For purposes of the present invention, however, it is contemplated that the automated teller machine 24 would additionally be equipped with a microreader 22 into which a customer would be enabled to insert a check to be cashed for optical scanning by the microreader. In addition, the control program stored in the microprocessor 26 of the automated teller machine 24 is modified from that of conventional automated teller machines commensurate with the expanded functionality of the machine for cashing checks utilizing the identification cards in accordance with the present invention, as more fully described below.

Specifically, the process methodology carried out by the automated teller machine 24 is shown in block diagram form in FIGS. 5A and 5B. The original issuance of an identification card to a customer will occur exactly as described above and depicted in FIG. 2. Such a customer bearing an identification card in accordance with the present invention initiates a check cashing transaction at the automated teller machine 24 by initially inserting his or her identification card into the card reading device 32 of the machine (box 1 in FIG. 5A), which thereby reads the encoded data contained on the magnetic strip of the card and communicates such data to the microprocessor 26. The control program of the microprocessor 26 then initiates a display message on the screen 28 prompting the customer to enter his or her personalized identification number (box 2), which the customer then carries out manually utilizing the keypad 30 (box 3).

The microprocessor 26 of the automated teller machine 24 then determines whether or not the customer has correctly input the personalized identification number by comparing the keyed input by the customer against the encoded identification number read from the magnetic strip on the card by the card reader 32 (box 4). If the personalized identification number has not been correctly entered by the customer, the microprocessor 26 causes a message to be displayed on the screen 28 prompting the customer to repeat the entry of the identification number (box 5b). If the customer has not correctly input the identification number after a predetermined number of attempts, the microprocessor 26 terminates the transaction and displays a termination message on the display screen 28 (box 6b).

If the customer has input the personalized identification number of the card correctly, the microprocessor 26 actuates a display on the screen 28 informing the customer to select among various transaction options (box 5a), one of which in accordance with the present invention will be to "cash a check." Upon the customer's selection of this option, e.g., by pressing one or more appropriate keys on the customer keypad 30 (box 6a), the microprocessor causes a message to be displayed on the screen 28 prompting the customer to insert the check to be cashed into the microreader 22 (box 7).

Upon insertion of the check by the customer into the microreader 22 (box 8), the microreader 22 optically scans the check (box 9) in the same manner as carried out by the microreader 22 at the teller station in the operation of the embodiment of FIG. 3. If the optical scan by the microreader is not successful, the microprocessor 26 actuates the microreader 22 to eject the check and a message is displayed on the screen 28 prompting the customer to reinsert the check into the microreader 22 (box 10b). If a successful optical scan of the check cannot be completed by the microreader 22 within a predetermined number of attempts, then the microprocessor 26 terminates the transaction (box 11b), displays a termination message to the customer on the display screen 28, and actuates the microreader 22 to return the check to the customer (box 12b).

When the microprocessor 26 is signaled by the microreader 22 that the inserted check has been successfully scanned, the microprocessor initiates a communication with the central mainframe computer 14 of the bank to transmit thereto the encoded data obtained from the magnetic strip by the card reader 32 along with the check data optically scanned by the microreader 22 (box 10a). The mainframe computer system then looks up the data file for the customer, verifies that the customer's identification card is active, and initiates the execution of the approval-disapproval algorithm stored within the mainframe computer (box 11a), in the same manner as performed in the embodiment of FIG. 3 described above. The determination by the mainframe computer system of an approval or disapproval of the check cashing transaction is then transmitted to the microprocessor 26 of the automated teller machine 24 (box 12a). If the transaction was disapproved as a result of the execution of the algorithm by the mainframe computer 14, the microprocessor 26 actuates the display on the screen 28 of an appropriate message to the customer, such as "transaction denied" (box 13b) and then actuates the microreader 22 to discharge the check for return to the customer (box 14c).

If, however, the algorithm carried out by the mainframe computer system 14 results in an approval of the transaction, the microprocessor 26 then initiates a query to the cash dispenser mechanism 34 to determine whether sufficient paper currency and coins remain within the repository of the dispenser mechanism 34 to satisfy the amount of the check to be checked (box 13a). If the cash dispenser has insufficient currency and coins to cash the check, the microprocessor 26 causes the screen 28 to display a corresponding message to the customer, such as "insufficient cash to satisfy transaction request" (box 14a) and the microprocessor 26 actuates the microreader 22 to discharge the check for return to the customer (box 15a).

On the other hand, if the cash dispenser mechanism 34 has sufficient currency and coins to cash the check, then the microreader 22 is actuated by the microprocessor 26 to print appropriate coded transaction data on the face of the check as a record of the transaction and deposits the check into an internal storage bin within the automated teller machine 24 (box 14b). The microprocessor 26 then actuates the cash dispenser mechanism 32 to dispense the precise amount of the check in paper currency and coins to the customer (box 15b). Upon completion of the transaction, the microprocessor 26 actuates the cardreader 32 to discharge the identification card for return to the customer (box 16).

As in the embodiment described above with respect to FIG. 3, the central mainframe computer system 14 is programmed to update each customer's data file according to each attempted or completed check cashing transaction at an automated teller machine 24, in the same manner as such data files are updated according to each completed or attempted check cashing transaction at an attended teller station. Accordingly, upon the completion of a check cashing transaction (box 16 in FIG. 5), the microprocessor 26 of the automated teller machine 24 transmits a completion signal to the central mainframe computer system 14, whereupon the customer's data file is accordingly updated with appropriate data representing the transaction as just completed. Likewise, upon an unsuccessful attempt by a customer to cash a check at an automated teller machine (such as represented by boxes 6b, 12b, or 14c), data representing the unsuccessful check cashing attempt by the customer is also transmitted to the central mainframe computer 14 to be stored in the customer's data file. In turn, the approval-disapproval algorithm carried out within the central mainframe computer system 14 examines such historical data as to prior transactions conducted or attempted by the customer as one factor to be evaluated in reaching the determination of an approval or disapproval of further check cashing transactions.

As discussed above and as will be appreciated by persons familiar with the banking industry or otherwise skilled in the relevant art, the security system of the present invention uniquely provides a substantially higher level of security against check cashing fraud and attendant losses than is currently available to banks utilizing conventional techniques and methods, at a substantially lower capital investment than is required by other currently available systems of sophisticated electronic customer identification. Furthermore, in addition to enabling banks to more carefully and accurately verify the identity of customers conducting cash-out transactions, the system and methodology of the present invention achieves the additional level of security of providing a reliable systematic means for determining approvals and disapprovals of check cashing transactions according to objective criteria and historical data without requiring the intervention of bank officers. Such a systematic approval-disapproval means and process is not believed to be otherwise available through any currently known system. It is believed that bank customers as a group will generally view the security system and process of this invention to be relatively unobtrusive and non-offensive, so as not to create any negative public perception among bank customers. Ultimately, the most fundamental advantage realized by banks under the present invention will be substantially lower losses due to cashing of bad checks and check fraud.

While the present invention has been herein described in relation to differing banking embodiments which are currently contemplated to be the optimal modes of carrying out the invention within the banking industry utilizing conventionally available electronic equipment and computer software processes and techniques, it is to be understood that the present invention is not intended to be limited to such embodiments but rather resides more fundamentally and broadly in the use of an exclusive identification card issued solely by a business under circumstances by which the business can best insure prevention of fraudulent or counterfeit cards. Most basically, such cards should have some means of being encoded with at least a personal identification number unique to an individual customer such that use of the cards by unauthorized third parties is largely prevented. While the preferred embodiments described above involve communication with the central mainframe computer system of the business in the performance of each transaction by a customer and the execution by the mainframe computer of an approval-disapproval analysis or algorithm, other more simplified embodiments of the invention are contemplated which do not rely upon communication with a mainframe computer or the execution of any approval-disapproval determination. For example, merely requiring customers to present a card encoded with a personalized identification number which must be correctly input by the customer upon electronic reading of the card at a transaction station (whether a bank teller station, an unattended automated teller machine, or another business location or other form of automated machine) establishes a significantly higher level of reliability and security in itself than is currently observed by a significant number of banks and other businesses who complete check cashing transactions, accept checks in payment of goods or services or otherwise engage in business transactions with customers based only on customer identification via a driver's license or other form of photographic identification. These and other variations, modifications and alternative embodiments of the present invention are intended to be within the broad scope and substance of the present invention. It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A security system for use by a business for establishing customer identification in, and determining approval for, acceptance from customers of bank checks drawn by third parties, comprising:

(a) means for issuing to each customer an individualized customer identification card having means encoded with a personalized multidigit customer identification number for subsequent identification of the customer;

(b) means for establishing for each customer predetermined criteria for determining approval of third-party checks presented by the customer; and (c) a transaction station for receiving third-party checks from customers, the transaction station including:

(i) means for reading the encoded means of each customer identification card upon presentation thereof by each customer;

(ii) means for customer input of the personalized customer identification number of the customer;

(iii) means for determining whether the customer correctly inputs the personalized customer identification number; and (iv) means for determining whether a third-party check presented by the customer satisfies the predetermined approval criteria established for the customer.

2. A security system according to claim 1, wherein the transaction station is an automated machine.

3. A security system according to claim 1, wherein the transaction station is operated by a representative of the business.

4. A security system according to claim 1, wherein the encoded means of the individualized customer identification card comprises an electronic data storage medium.

5. A security system according to claim 1, wherein the card reading means comprises a card receiving slot for customer insertion of the identification card and the customer input means comprises a numeric keypad.

6. A security system according to claim 1, wherein the transaction station includes means for reading data from a third-party check presented by the customer.

7. A security system according to claim 1, further comprising a centralized data storage and processing means for storing predetermined data on each customer and the transaction station comprises means for communicating with the centralized data storage and processing means.

8. A security system according to claim 7, wherein the centralized data storage and processing means comprises means for determining approval of third-party checks presented by each customer according to the predetermined criteria established for the customer.

9. A security system according to claim 8, wherein the centralized data storage and processing means includes means for compiling for each customer historical data on third-party checks presented by the customer.

10. A security system according to claim 1, wherein at least one of the customer identification card and the centralized data storage and processing means stores the predetermined criteria to be established for third-party checks presented by the customer.

11. A banking security system for establishing customer identification in, and determining approval for, cashing for customers of bank checks drawn by third parties, comprising:
    (a) a centralized data storage and processing means for storing predetermined data on each customer, the data storage and processing means including means for determining approval of third party checks presented by customers according to predetermined criteria;
    (b) means for issuing to each customer an individualized customer identification card wherein predetermined personal information regarding the customer and any individualized predetermined criteria to be established for cashing of third-party checks for the customer are obtained and input into the data storage and processing means and wherein the card has means encoded with at least some of the predetermined personal information regarding the customer and with a personalized multi-digit customer identification number collectively sufficient for identification of the customer; and
    (c) a transaction station for cashing third-party checks, the transaction station including:
        (i) means for reading the encoded means for each customer identification card upon presentation thereof by each customer;
        (ii) means for customer input of the personalized customer identification number of the customer;
        (iii) means for determining whether the customer inputs the personalized customer identification number; and
        (iv) means for communicating with the centralized data storage and processing means for actuating the approval determination means thereof to determine an approval or disapproval for cashing a third-party check presented by the customer according to the predetermined criteria established in the data storage and processing means, including any individualized predetermined criteria established for the customer individually.

12. A banking security system according to claim 11, wherein the card issuing means and the transaction station are located within a bank location remote from the centralized data storage and processing means.

13. A banking security system according to claim 11, wherein the transaction station is an automated teller machine.

14. A banking security system according to claim 11, wherein the transaction station is operated by a bank representative.

15. A banking security system according to claim 14, wherein the transaction station includes means for displaying to the bank representative the determination of whether the customer correctly inputs the personalized customer identification number.

16. A banking security system according to claim 15, wherein the transaction station includes means for displaying to the bank representative the encoded personal information regarding the customer as read by the card reading means from the customer identification card.

17. A banking security system according to claim 15 or 16, wherein the displaying means comprises a visual display monitor.

18. A banking security system according to claim 11, wherein the encoded means of the individualized customer identification card comprises an electronic data storage medium.

19. A banking security system according to claim 11, wherein the card reading means comprises a card receiving slot for customer insertion of the identification card and the customer input means comprises a numeric keypad.

20. A banking security system according to claim 11, wherein the transaction station includes means for reading data from a third-party check presented by the customer for cashing.

21. A banking security system according to claim 20, wherein the check reading means comprises a microreader device.

22. A banking security system according to claim 11, wherein the approval determining means comprises a computer processor for executing an approval-disapproval algorithm upon each presentation by the customer of a third-party check for cashing.

23. A banking security system according to claim 11, wherein the centralized data storage and processing means includes means for continuously compiling and updating for each customer historical data on third-party checks cashed by the customer.

24. A banking security system according to claim 23, wherein the approval determining means comprises a computer processor for executing upon each presentation of a third-party check by the customer an approval-disapproval algorithm based on the historical data on the customer.

25. A security method for use by a business for establishing customer identification in, and determining approval for, acceptance from customers of bank checks drawn by third parties, comprising:
    (a) issuing to each customer an individualized customer identification card storing in an encoded form a personalized multidigit customer identification number for subsequent identification of the customer;
    (b) establishing for each customer predetermined criteria for determining approval of third-party checks presented by the customer; and
    (c) upon each presentment of a third-party check by each customer:
        (i) requiring the customer to present the identification card;
        (ii) reading the encoded identification number by means of a card reading device to identify the customer;
        (iii) requiring the customer to input into the card reading device the personalized identification number assigned to the customer; and (iv) determining approval or disapproval of the third-party check according to the predetermined criteria established for the respective customer.

26. A security method according to claim 25, wherein the presentment of the third-party check is made to a representative of the business.

27. A security method according to claim 25, wherein the presentment of the third-party check is made to an automated machine.

28. A security method according to claim 25, wherein the issuing of each identification card includes electronically encoding the customer identification number onto the card.

29. A security method according to claim 25, wherein the presentment of the third-party check is conducted at a transaction station at which is located the card reading device and a keypad associated therewith for input by the customer of the personalized customer identification number.

30. A security method according to claim 25, wherein the presentment of the third-party check comprises reading data from the third-party check presented by the customer for processing by means of another reading device.

31. A banking security method according to claim 25, further comprising providing a centralized data storage and processing means for storing predetermined data on each customer and the presentment of the third-party check comprises communicating with the centralized data storage and processing means.

32. A security method according to claim 31, wherein the determining of approval or disapproval of the third-party check is performed according to the predetermined criteria by means of the centralized data storage and processing means.

33. A security method according to claim 32, and further comprising continuously compiling in the centralized data storage and processing means historical data on third-party checks presented by each customer.

34. A security method according to claim 25, further comprising storing up predetermined criteria for each customer by at least one of the customer identification cards and a centralized data storage and processing means.

35. A banking security method for establishing customer identification in, and determining approval for, cashing for customers of bank checks drawn by third parties, comprising:
(a) providing a centralized data storage and processing means including means for determining approval or disapproval of third-party checks presented by customers according to predetermined criteria;
(b) for each customer, obtaining and storing in the centralized data storage and processing means predetermined personal information regarding the customer and any individualized predetermined criteria to be established for cashing of third-party checks for the customer;
(c) issuing to each customer an individualized customer identification card storing in an encoded form at least some of the predetermined personal information regarding the customer and a personalized multidigit customer identification number collectively sufficient for subsequent identification of the customer; and
(d) cashing each third-party check by each customer by:
(i) requiring the customer to present the identification card upon each presentment of a third-party check;
(ii) reading the encoded personal information and identification number by means of a card reading device to identify the customer;
(iii) requiring the customer to input into the card reading device the personalized identification number assigned to the customer; and
(iv) communicating with the centralized data storage and processing means for initiating execution thereby of a determination of approval or disapproval of the third-party check presented by the customer according to the predetermined criteria established for the customer individually.

36. A banking security method according to claim 35, wherein the obtaining of the predetermined personal information regarding the customer, the issuing of the identification card to each customer, and the cashing of third-party checks are performed within a bank location remote from the centralized data storage and processing means.

37. A banking security method according to claim 35, wherein the cashing of third-party checks is performed by an automated teller machine.

38. A banking security method according to claim 35, wherein the cashing of third-party checks is performed by a bank representative.

39. A banking security method according to claim 38, further comprising displaying to the bank representative the determination of whether the customer correctly inputs the personalized identification number.

40. A banking security method according to claim 39, further comprising displaying to the bank representative the encoded personal information regarding the customer as read by the card reading means from the customer identification card.

41. A banking security method according to claim 35, wherein the issuing of each identification card includes electronically encoding the at least some predetermined personal information regarding the customer and the customer identification number onto the card.

42. A banking security method according to claim 35, wherein the cashing of third-party checks is conducted at a transaction station at which is located the card reading device, a keypad associated therewith for input by the customer of the personalized customer identification number, and means for communicating with the centralized data storage and processing means.

43. A banking security method according to claim 42, wherein the cashing of third-party checks comprises reading data from the third-party check presented by the customer for cashing by means of a check reading device.

44. A banking security method according to claim 35, wherein the execution by the centralized data storage and processing means of a determination of approval or disapproval of the third-party check comprises executing an approval-disapproval algorithm.

45. A banking security method according to claim 35, and further comprising continuously compiling and updating in the centralized data storage and processing means historical data on third-party checks cashed by each customer.

46. A banking security method according to claim 45, wherein the execution of the determination of approval or disapproval of each third-party check comprises executing an approval-disapproval algorithm based on the historical data on the customer.

* * * * *

UNITED STATES PATENT AND TRADEMARK OFFICE
CERTIFICATE OF CORRECTION

PATENT NO. : 6,105,011
DATED : August 15, 2000
INVENTOR(S) : Morrison, Jr.

It is certified that error appears in the above-identified patent and that said Letters Patent are hereby corrected as shown below:

Col. 2, line 67, delete "care" and insert therefor -- card --.

Col. 9, line 3, delete "twenty" and insert therefor --20--.

Col. 12, line 36, delete "checked" and insert therefor --cashed--.

Col. 12, line 50, delete "32" and insert therefor --34--.

Col. 17, line 39, delete "up" and insert therefor --the--.

Signed and Sealed this

Seventeenth Day of April, 2001

*Attest:*

NICHOLAS P. GODICI

*Attesting Officer*  Acting Director of the United States Patent and Trademark Office